United States Patent [19]
Kallman et al.

[11] Patent Number: 5,496,239
[45] Date of Patent: Mar. 5, 1996

[54] EXERCISE AND SKI SIMULATING DEVICE

[76] Inventors: Robert Kallman, 506 Gregory Ave., Weehawken, N.J. 07087; Mark Plotnick, 147-11 16th Rd., Whitestone, N.Y. 11357; Burton A. Weinstein, 4 Windward La., City Island, N.Y. 10464

[21] Appl. No.: 122,789

[22] Filed: Sep. 16, 1993

[51] Int. Cl.⁶ ................................. A63B 69/18
[52] U.S. Cl. ............................. 482/71; 482/51
[58] Field of Search ................. 482/51, 71, 70, 482/148, 72

[56] References Cited

U.S. PATENT DOCUMENTS

| | | |
|---|---|---|
| 2,274,081 | 2/1942 | Mautin . |
| 2,657,055 | 10/1953 | Denham . |
| 3,021,137 | 2/1962 | Palmer et al. . |
| 3,475,021 | 10/1969 | Ruegsegger . |
| 3,531,110 | 10/1970 | Marchu . |
| 3,575,412 | 4/1971 | Arsenian . |
| 3,591,172 | 7/1971 | Hude . |
| 3,650,528 | 3/1972 | Natterer . |
| 3,807,727 | 4/1974 | Ferguson . |
| 4,101,136 | 7/1978 | Corll . |
| 4,396,189 | 8/1983 | Jenkins . |
| 4,423,864 | 1/1984 | Wilk . |
| 4,429,869 | 2/1984 | Eckstein . |
| 4,544,153 | 10/1985 | Babock . |
| 4,595,195 | 6/1986 | Miehlich . |
| 4,607,839 | 8/1986 | Knudson . |
| 4,645,202 | 2/1987 | Tomba et al. . |
| 4,669,723 | 6/1987 | Arsenian ........................... 482/71 |
| 4,743,014 | 7/1987 | Loane . |
| 4,744,557 | 5/1988 | Smirmaul . |
| 4,744,558 | 5/1988 | Smirmaul . |
| 4,802,856 | 2/1989 | Olson . |
| 4,869,496 | 9/1989 | Colombo . |
| 4,907,796 | 3/1990 | Roel-Rodriguez . |
| 4,909,503 | 3/1990 | Olson . |
| 4,953,853 | 9/1990 | Loane . |
| 5,020,793 | 6/1991 | Loane . |

FOREIGN PATENT DOCUMENTS

| | | |
|---|---|---|
| 204939 | 8/1959 | Austria . |
| 832295 | 9/1938 | France . |
| 444733 | 2/1968 | Switzerland . |
| 3024191 | 12/1993 | WIPO ..................................... 482/71 |

OTHER PUBLICATIONS

Brochure for "The Ski Trainer" of Kallman Research Corp. (4 pp.).

*Primary Examiner*—Stephen R. Crow
*Attorney, Agent, or Firm*—Sprung, Horn, Kramer & Woods

[57] ABSTRACT

A downhill skiing/snowboarding/water skiing simulator and exerciser is disclosed, having an adjustable declined platform on which two simulated skis move, supported on rear wheeled trucks, sideways against tension type resistance riding back and forth its curved back track. Simultaneously with the rear movement, the ski tips or simulated snowboard pivot around the reduced lateral travel of the stacked swiveling, lateral moving front ski tip assembly, while the skis move between wedge and parallel positions freely. Independent height adjustments on either side of the back track allow changes from traversing directional simulations prior to the start of an actual stop movement. Outward angled standing bars provide pulling forces for the feel of the centrifugal force of a snow ski turn or water ski/snowboard turn. The forward end of each ski is capable of lateral and longitudinal movement.

30 Claims, 12 Drawing Sheets

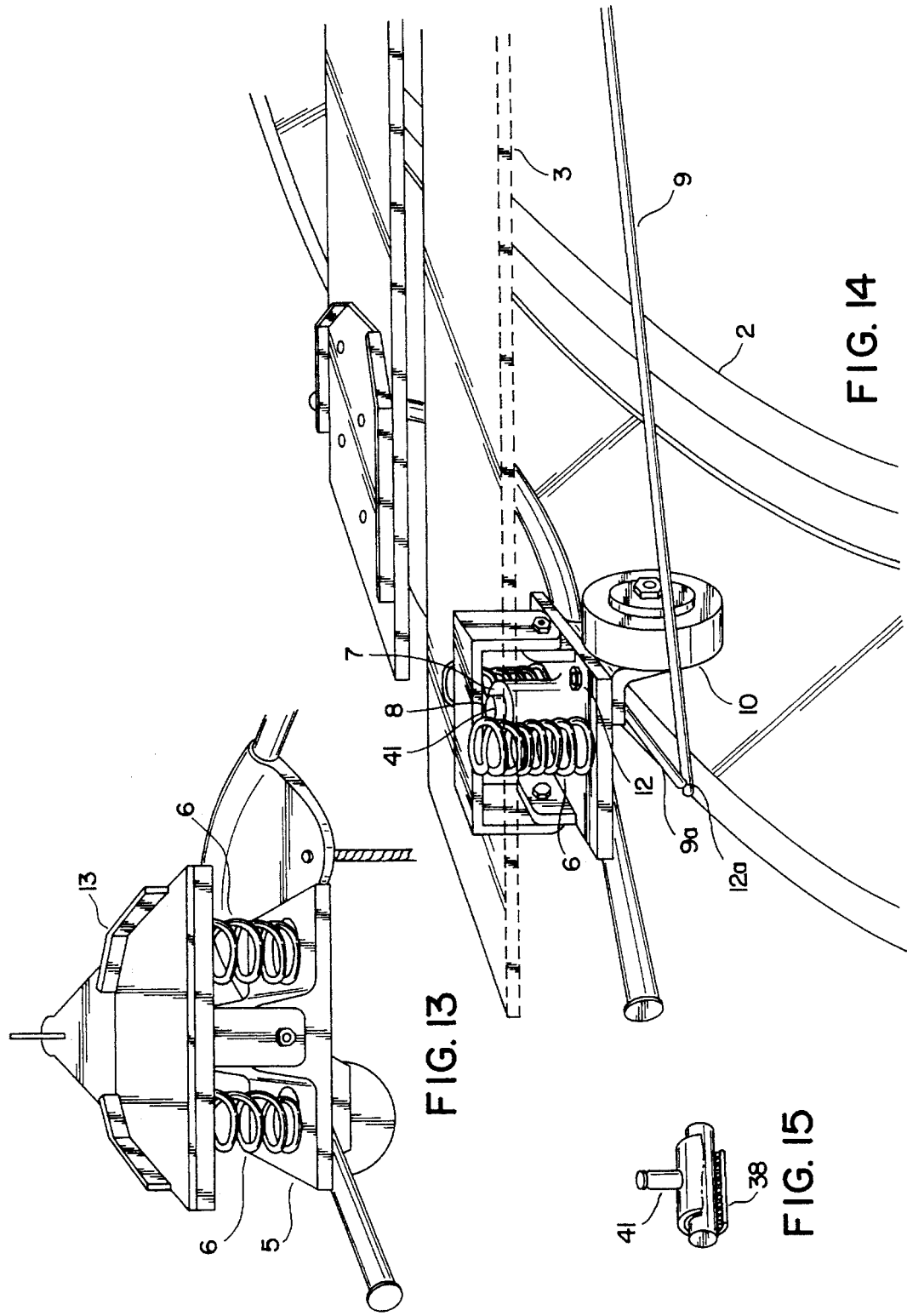

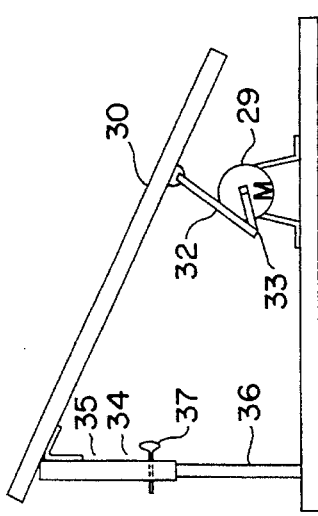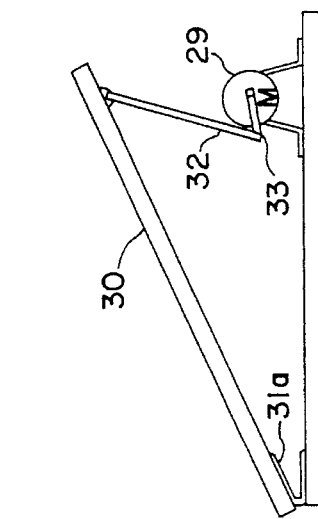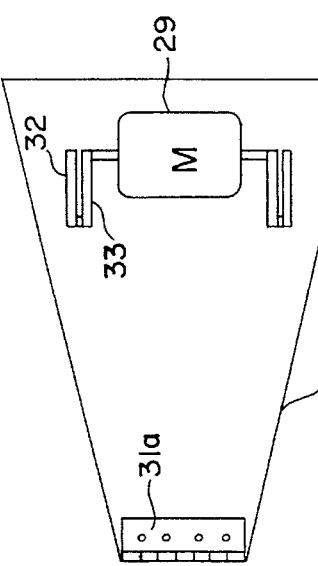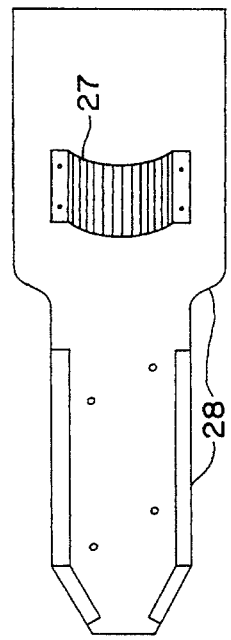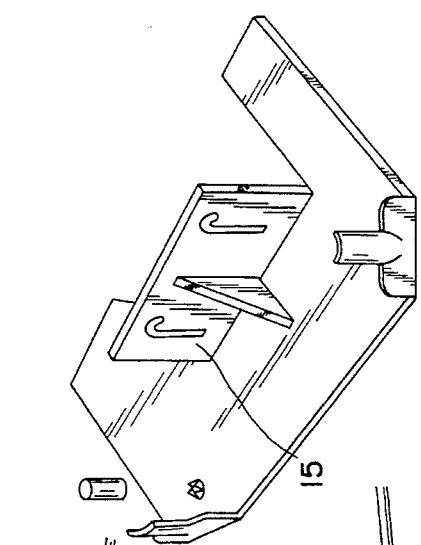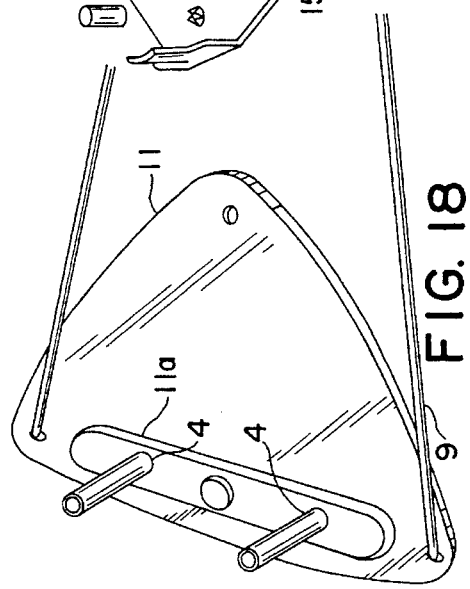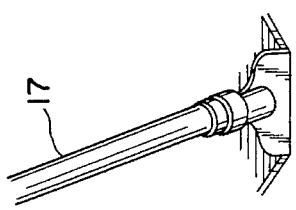

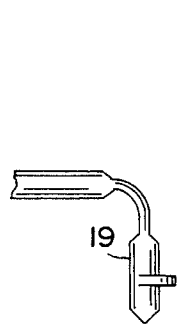
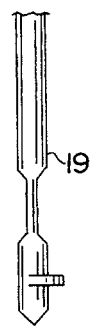
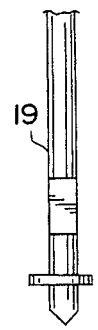
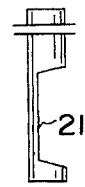
FIG.23　　FIG.24　　FIG.25　　FIG.26
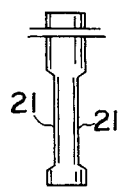
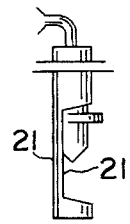
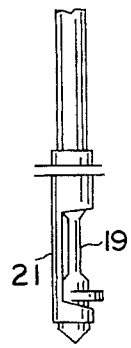
FIG.27　　FIG.28　　FIG.29
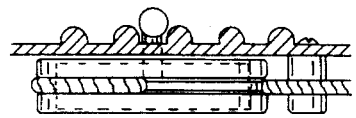
FIG.34
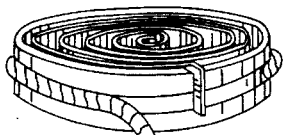
FIG.33
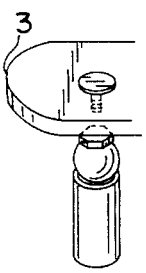
FIG.35
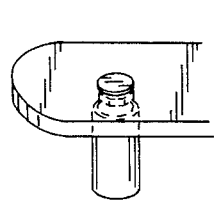
FIG.36

FIG.31
FIG.32

EXERCISE AND SKI SIMULATING DEVICE

CROSS REFERENCE TO RELATED APPLICATION

The entire disclosure of the U.S. patent application Ser. No. 729,556, filed May 1, 1985 for SKI EXERCISER (now abandoned) is incorporated herein by reference. The provisions of 35 USC §122 are hereby waived for this abandoned application.

BACKGROUND OF INVENTION

The invention concerns exercising devices in general and, more particularly, devices for exercising and practicing skiing/snowboard turns in a manner that simulates actual body and leg movement for a ski turn.

Devices for exercising and for practicing turning movements employed while skiing are known. For example, United States patents to Mautin U.S. Pat. No. 2,274,081, Denham U.S. Pat. No. 2,657,055, Roel-Rodriquez U.S. Pat. No. 4,907,796, Tomba et al. U.S. Pat. No. 4,645,202, Knudson U.S. Pat. No. 4,607,839, Coral U.S. Pat. No. 4,101,136, Miehlich U.S. Pat. No. 4,595,195, Babock U.S. Pat. No. 4,544,153, Eckstein U.S. Pat. No. 4,429,869, Jenkins U.S. Pat. No. 4,369,189, Scriver U.S. Pat. No. 2,445,274, Smirmaul U.S. Pat. Nos. 4,744,558 and 4,744,557, Palmer U.S. Pat. No. 3,021,137, Arsenian U.S. Pat. No. 3,575,412 and Canadian patent No. 532,029, French patent No. 832,295, Swiss patent No. 444,733 and Austrian patent No. 204,939 disclose devices which are, however, expensive to manufacture inasmuch they require elaborate structures for the simulation of skiing conditions. Moreover, these devices are heavy and not easily movable or transportable. At least one of such known devices requires ski boots, thus requiring extra time and cost on the part of the user. None of these devices has two individual laterally positioned horizontal tilting means to change the ski's position relative to the fall line so as to enable one to commence skiing from a traverse position, a foldable edging indicating system necessary for comprehending the edging relationship between the movements with the device and those employed while skiing, or an individual front and rear moving vertical system for simulating bump—i.e. mogul—or sharp slope angle changes representing real skiing conditions. None of the prior art devices has a tension resistance to a combined spread apart and parallel lateral movement so as to be able to move freely between wedge and parallel position by sliding units on its connecting rear tensioned sliding tie bar which simultaneously sweeps out an arc across the back track, relatively parallel with the reduced lateral movement of the front tip assembly. None of the prior art devices incorporates a water skiing or snowboarding (dynamic or static) mode. None provides the combination of movements of a ski exerciser with interactive video capability on motorized versions. None has firmly held outward angled removable standing bars that form centrifugal simulating inclination supports that allow for a strong pulling effort in order to equal the pull and feel of centrifugal force present in normal snow skiing situations and especially for racing type turns. None of the prior art devices enables a sideways tip movement used to initiate modern turns that start with steering so as to move quicker from one turn to the next. None provides lateral movement in order, through fore to aft control rods, to provide a wide arc—i.e. a flattened center type arc movement—for reduced wheel scrub (wear) and wider track for longer, straighter rear of ski travel. None shows centered foot retaining guides along the tops of the ski type lengths for flex—i.e. reverse bending means and forward ski movement means—for selective rearward bending—i.e. a rearward moving apex—in order to more sharply contour (bend) that moving section of the ski's length in pressured contact with the ski slope, to adjust the radius of the turn to that of the desired trajectory of turn. This ski bend producing concentration of force may be applied by use of leverage action to the stiff vertical section of a heal binding with a Velcro attachment to a user's ankles and to the midpoint area (between knee and ankle) of the users leg.

SUMMARY OF INVENTION

It is a principal object of the present invention to incorporate both actual ski movements and ski slope forces with instantaneous feedback in a ski training system for downhill or water skiing or snowboarding.

It is a further object of the present invention to provide a ski training system with the capability of requiring the same type of bodily movements demanded for stopping, checking, traversing or short turns or "Wedels", carve or powder turns, in wedge (snowplow) to parallel skiing as well as mogul techniques and ski drop offs—i.e. sharp angle changes of the downhill slope—with an optional motorized platform adapter system that vertically moves the back track and/or front assembly individually and that can be optionally coordinated with an audio/video system.

More especially, it is an object of the present invention to provide an exercise and ski exercise device which employs all the above-noted features the others omit, as required for teaching the full range of movements for snowskiing/snowboarding and water skiing. The device according to the invention is an improvement on the Cliff Taylor Ski simulator from Great Eastern Products of Trumbull, Conn. and "The Ski Trainer" from Panaram International of Rutherford, N.J. that employed two individually edgeable simulated skies that move on wheels together (in parallel) sideways on a back track in an inclined arc pivoting around each ski's front universal pivot ball joints against opposing spring and cable resistance.

These objects, as well as other objects which will become apparent from the discussion the follows, are attained by a exerciser or ski trainer for practicing the turning movements employed while skiing which comprises two ski-type platforms universally supported at their forward end portions, and having the rear end portion of the ski type platforms supported on rollers that move laterally along a vertical arc about the lateral moving front pivots. Foot retaining guides rear centrally located atop the flexible, tip, and tail supported, skis translate the thrust of the body movement by the user standing centrally on the skis into movement of the skis, about the laterally moving front pivot and base, including individual ski tilting-bending and moving randomly from parallel to wedge or snowplow position with the same snow resistance as when a skier is moving on the ski slope. The device has the advantages of producing a constellation of turning movements not previously possible with such a uniquely simple and compact structure.

Other basic improvements include two (stacked) front swivel plates for jet action contemporary and racing techniques, inclination supports for simulating centrifugal forces and the contemporary techniques for skiing and snow boarding, and a motorized tiltable platform for mogul and vertical slope changes and drop offs and water skiing modes. An interactive visual, mechanical and/or audio or audio/visual system is also provided in order to provide instant feedback to the user from monitor points apart back track and front assembly parts of the ski exerciser.

For ski/snowboard machine simulations in packed powder slope conditions for the practicing of decelerating (skid) type turns, a normal tension is applied to a laterally moveable rear truck which positionally places the user, standing on the skies at the center (apex) point of a vertically arced back track (equally distant from either side). From this central point the users weight transfer from one foot to the other forces the rear laterally movable truck, by gravity, to move downwards to one side towards the direction of the outward tangent vector direction of the foot receiving the transference of weight. Simply stated, when one's left foot is lifted, the truck rolls to the right whereupon the elastic tension means then overcomes gravity and bounces back. If the user then lifts up his right foot the rear truck moves to the left past the central apex of the back track, which now supplies additional gravitational supplied potential energy coupled with the laterally moving inertial mass. With a rhythm, using this weight transference, one can simulate deceleration turning downhill skiing technique with the tails moving back and forth laterally simulating dynamic drag resistance to the forward movement of the skier. A similar technique can be used for acceleration (carving) turns—i.e. bending a ski by using a timed edge pressure of the inside edge of the canted (tilted inward) ski. This must be accomplished before that ski has moved past the fall line and would simulate the non-skidding arc of a carving ski turn favored by expert skiers. This weight transferring leg pressure change that produces a carved turn simulation on the machine should occur during sideways ski tail movement along the back track at or before reaching the central (apex) section atop the raised arc of the back track. For powder type skiing simulations using the ski machine, the reducing of the rear truck tension places the user now standing on the skies statically in a position off center, between the central apex point and either lateral edge of the back track, whereupon any leg transference of weight would not produce any movement. By the user vertically bouncing (thrusting) upward (not using any weight transference) equally weighing both feet, with the said reduced tension, the rear truck would momentarily move laterally to the center apex of the back track and back towards the side it started from. In conjunction with the aforesaid bouncing, bringing the rear truck supporting ski tails to center, an accompanying rotational body movement produced at the apex by the downward and forward reaching arm movement of the user (simulating a pole plant), using the same side arm as the direction of lateral movement, would result in a complete movement from one side to the other (180 degrees) of the ski's tails, similar to deep powder technique performed by a competent powder skier. Continued bouncing (back and forth) movements with the sideways leading arm performing a timely pole plant produces a synergistic rhythm of these side to side tail movements that both stabilize and provide downhill speed control from snow resistance to the angular positions of the skies of the moving skier. This deep powder skiing technique (using positionally timed unweighting) with the forward moving (downhill) force of the users inertial mass and the subsequent drag of the tail section of the skies, resulting from proper position relative to the horizontal—i.e. the tail section (rear) deeper embedded than the ski tip (front) into the powder snow—causing a rotation of the skies from a traverse (sideways position) into a fall line (straight down the hill) position. This is similar to a vehicle making a turn by rotating the steering wheel, forcing the castered front wheels directionally to turn off center. If, when the turn is completed, the driver releases the steering wheel while maintaining momentum, the wheel will realign in a straight (centered) position.

These bodily actions on this improved ski exercising device simulate the movements required for control of altering direction and speed on skies. Although the exerciser cannot give the sensation of forward motion, it develops and exercises the appropriate muscles and improves balance and coordination. If a skier has been absent from the slopes for a few weeks, he or she can use the trainer for several minutes each day and then, upon returning to the slopes, get back on skies without feeling out of practice. The exercising device alone will not make the skier an expert. It will however, improve his skiing and keep the appropriate muscles in condition. Accordingly, it is possible for a ski or professional or instructor to simplify, condition and pass on the skiing experience to others, without the pain, expense, time, frustration, and danger of "on slope" ski lessons and practice time by use of this safe, home or health club ski exercise machine.

For a full understanding of the present invention, reference should now be made to the following detailed description of the preferred embodiments of the invention as illustrated in the accompanying drawings.

BRIEF DESCRIPTION OF DRAWINGS

FIG. 13 is a rear view of the adjustable fore and aft foot positionable foot plate and tie bar and truck assembly.

FIG. 14 is a top perspective view of the sliding angled tie-bar and slidably connecting truck assembly and wheel control rod for communicating mechanical forces to the laterally moveable front tip assembly.

FIG. 15 is a cutaway view of the pin sliding sleeve that slidably attaches to the truck of the tie-bar.

FIG. 16 is a top perspective view of an individual height adjuster.

FIG. 17 is a top plan view of a slalom water ski adapter plate.

FIG. 18 is a top perspective view of the double swivelling front laterally moveable pivot assembly control rods for mechanically communicating forces to either direct wheel steering or as pivot connections to underside of equidistant perspective attachment points alongside the back track.

FIG. 19 is a side perspective view of a single centrifugal simulating inclination support base.

FIG. 20 is a top plan view of a motorized declined snow ski type mogul simulator without the top platform.

FIG. 21 is a side plan view of a mogul or terrain varying simulator for snow.

FIG. 22 is a side plan view of an inclined water ski type exerciser.

FIG. 23 is a side plan view of the bottom of the retractable edging indicator in flexed position.

FIG. 24 is a side plan view of the bottom of an edging indicator in a straight position.

FIG. 25 is a front plan view of the bottom of an edging indicator.

FIG. 26 is a side plan view of the edging indicator sleeve.

FIG. 27 is a rear plan view of the edging indicator sleeve.

FIG. 28 is a side plan view of the flexed edging indicator inside the metal sleeve.

FIG. 29 is a side plan view of the retracted erect edging indicator.

FIG. 31 is a top perspective view showing the edging indicator in the retracted erect position.

FIG. 32 is a bottom perspective view showing the edging indicator in a sleeve in the retracted erect position.

FIG. 33 is a top perspective view of the adjustable wound tension spring and guides.

FIG. 34 is a side plan view of the wound spring and tension adjustment arm.

FIG. 35 is a top exploded view of a front pivot universal ball joint assembly for attachment to laterally moving front assembly.

FIG. 36 is a top perspective clear view of a front ski platform pivotally attached to a front pivot pin.

DESCRIPTION OF THE PREFERRED EMBODIMENTS

Figure 1:
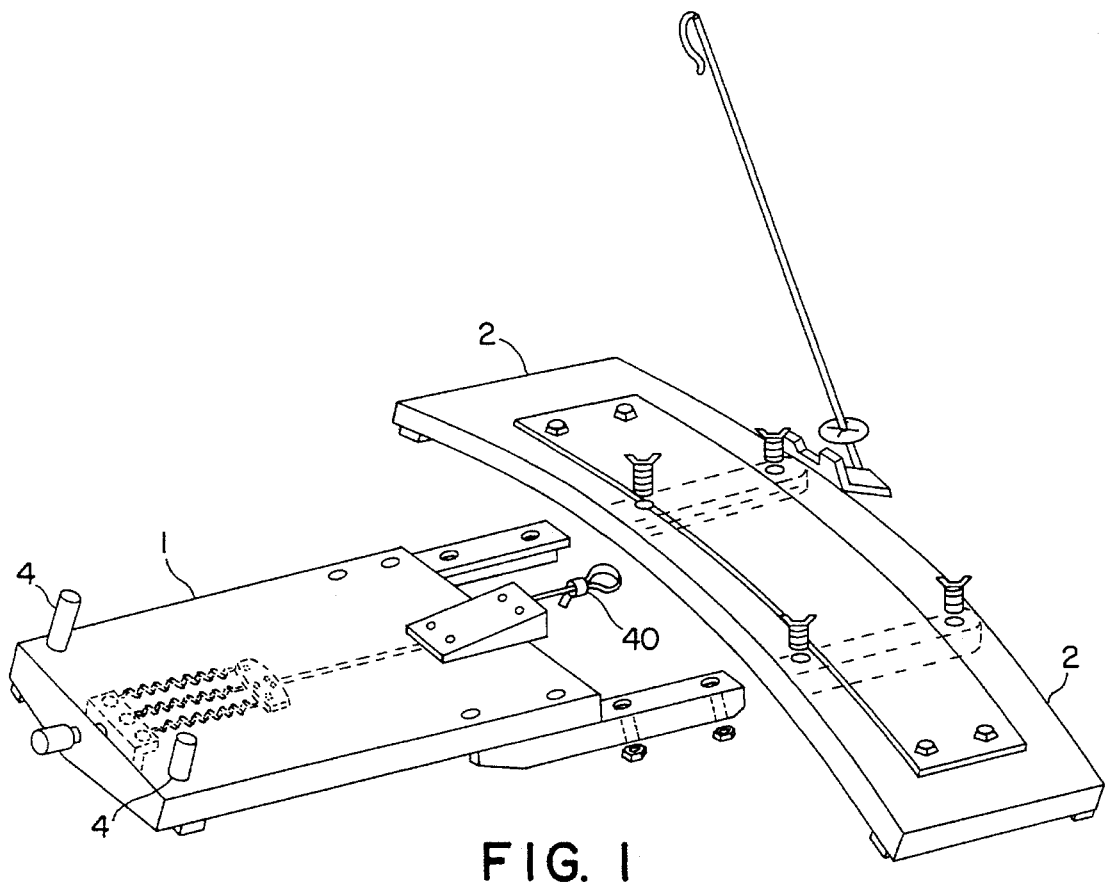
FIG. 1 is a perspective top-side view of a prior art "Cliff Taylor Ski Simulator" skiing device shown without the two ski type platforms.

The preferred embodiments of the present invention will now be described with reference to FIGS. 1–39 of the drawings. Identical or similar elements shown in the various figures are identified with the same reference numerals.

Figure 2:
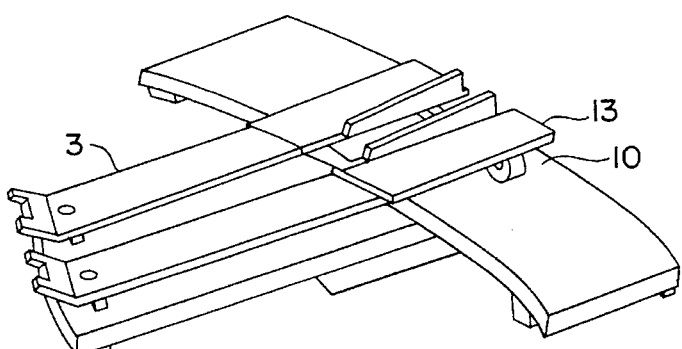
FIG. 2 is a perspective top-side view of the skiing device of FIG. 1 with its two ski type platforms.

FIGS. 1 and 2 illustrate the so-called "Cliff Taylor Ski Simulator". This skiing device comprises a base 1 which is bolted to an arcuate back track 2. A pair of skis 3 are pivoted at their forward ends to the base 1 by means of vertically oriented pivots 4. The skis 3 are connected together at their rearward ends to maintain them substantially in parallel. Caster wheels 10 are attached beneath the rearward end of each ski and arranged to roll upon the back track 2. Footplates 13 are disposed on the skis at their rearward ends immediately above the back track 2 and wheels 10.

Figure 3:
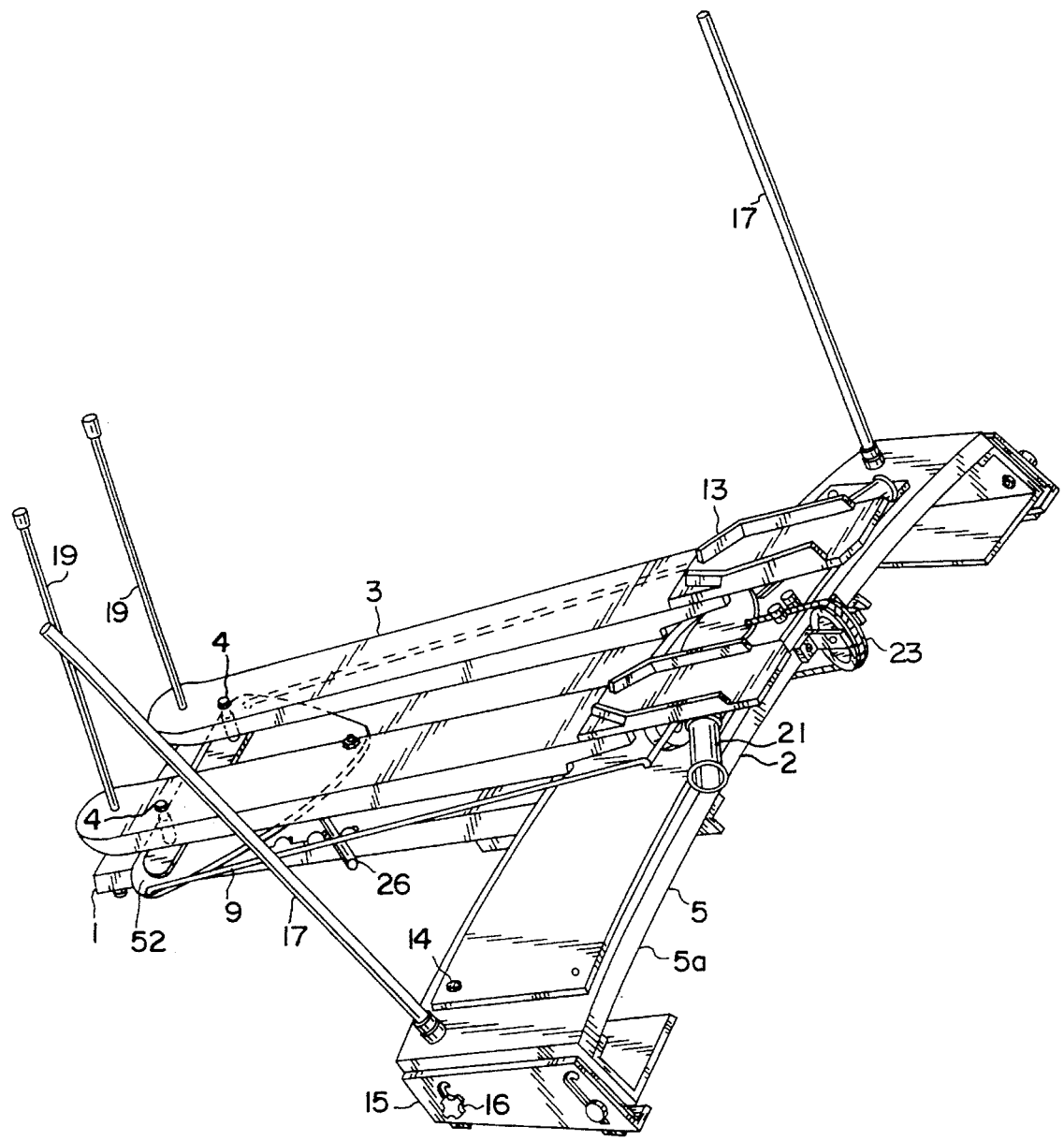
FIG. 3 is a perspective view of an improved ski exerciser according to one preferred embodiment in a starting position showing both lower triangular lateral and second vertically stacked pivot support means atop and therebetween its front laterally moving support means and rear laterally moveable track support means which rides side to side atop a transverse back track supported at its distal ends by vertically adjustable supports.

FIG. 3 depicts a first preferred embodiment of the present invention. As will be seen at a glance, this embodiment has a number of elements which are similar to the Cliff Taylor simulator of FIGS. 1 and 2. The ski device of FIG. 3 has a base 1, a back track 2 and two parallel skis 3 pivoted at their forward ends. In this case, however, the pivots 4 are arranged on a pivot assembly 52 which, in turn, is pivoted on the base 1. The combination of the base 1 and pivot assembly 52 will hereinafter be denominated as the "front assembly".

Unlike the Cliff Taylor simulator, the skis 3 are universally pivoted to the vertical pivots 4 to permit sideways (edge to edge) movement in addition to rotating movement about the vertical pivot. This may be accomplished by a pivoting ball arrangement as illustrated in FIGS. 35 and 36.

As seen from FIG. 3, the front assembly 1 and 52 is physically attached—e.g., by means of longitudinal channel members or bars—to the back track 2. The ski type platforms 3, connected by universal joints to the pivots 4 of the assembly 1, rest on trucks 5 which are more clearly illustrated in FIGS. 13 and 14. Each truck carries two helical springs 6, and is welded, bolted or the like to the bottom of the skis. A pin housing 7, between the springs, holds a pin with a spring clip 8. Wheel units 10 are pivotally mounted at pivot points 12. Wheel turning control rods 9 run from the wheel units 10 of the trucks to the respective sides of a swivelling front pivot assembly 52, as shown in FIG. 3. The rear of each rod is pivotally connected at a pivot point 12a to a rod 9a which, in turn, is connected to the bottom of each truck. The purpose of the control rods 9 and 9a is to "steer" the truck wheels to prevent their scrubbing on the back track.

Footplates—i.e. front retaining guides 13—are connected atop both rear ends of the skis, or alternatively to a more centralized position 54 of the flexible ski length.

A safety stop 14 marks the end of each back track run. Individual height adjustments of the back track are provided by brackets 15 and knob/screws (16).

Two lay flat foldable edging indicators 19 are in upward position at the front of the skies.

Figure 4:
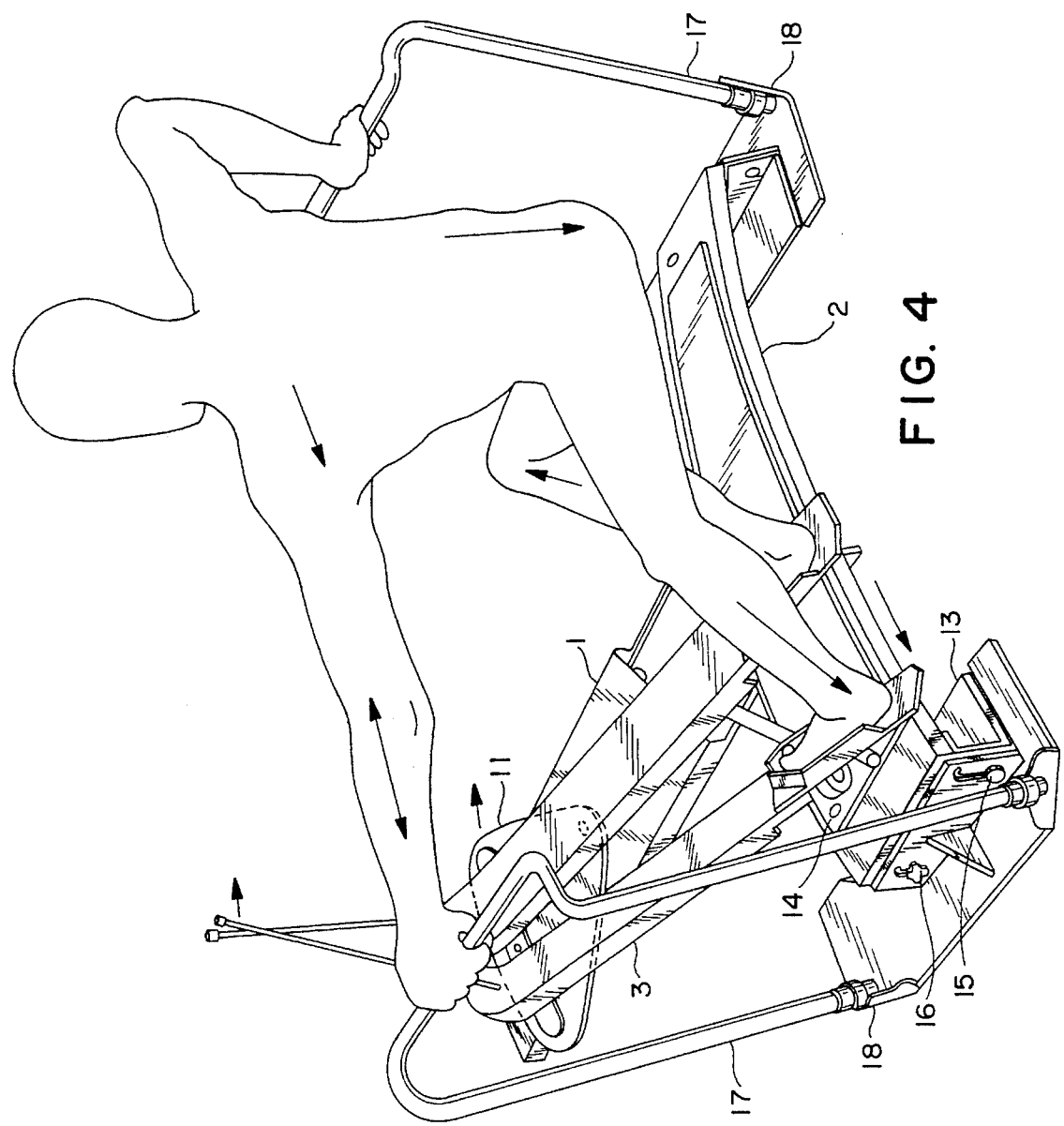
FIG. 4 is a perspective view of an improved ski exerciser according to a further preferred embodiment showing dynamic use of centrifugal force simulating inclinating supports with simultaneous edging, edging indication, wedge ski tip initiation movement and full radial movement to one side from a tension extension as well as simultaneous lateral and rotational ski tip support means.

FIG. 4 shows near U-shaped inclination supports 17 which are set into the corner-shaped receiving flanges 18 of the height adjusters 15 (FIG. 16).

Figure 5:
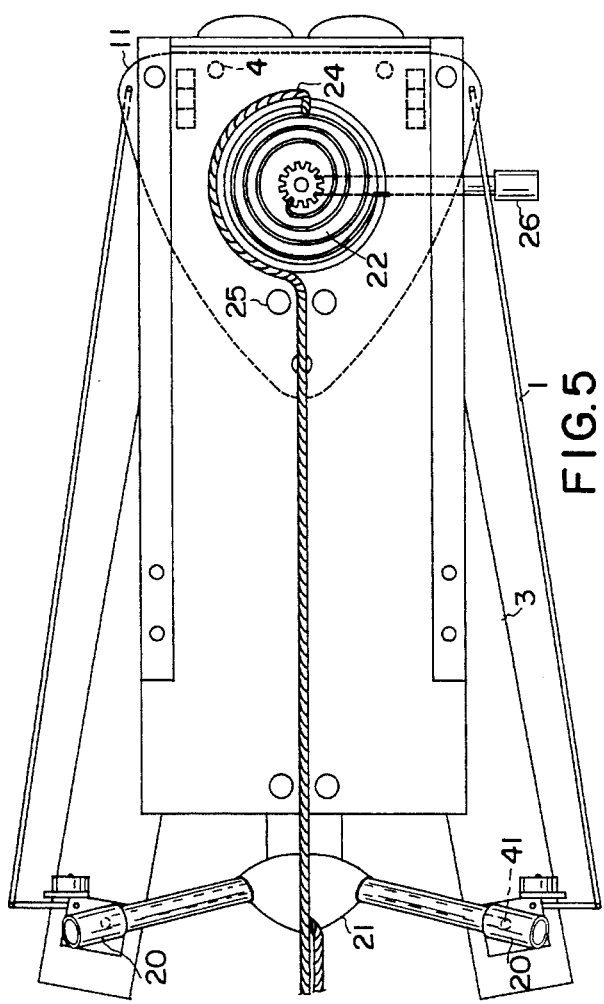
FIG. 5 is a bottom plan view of an improved ski exerciser according to the preferred embodiment showing the ski-type platforms in a wedge-type spread apart position with the distal movement of its slide bearing opposing the increased tension and unwinding of the tension means.
Figure 6:
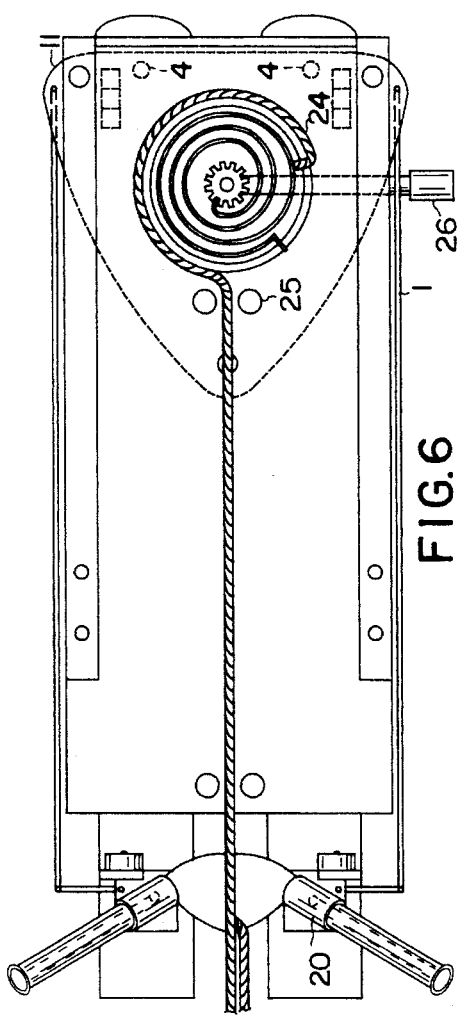
FIG. 6 is a bottom plan view of the improved ski exerciser of FIG. 5 in a static position with its back track detached.
Figure 7:
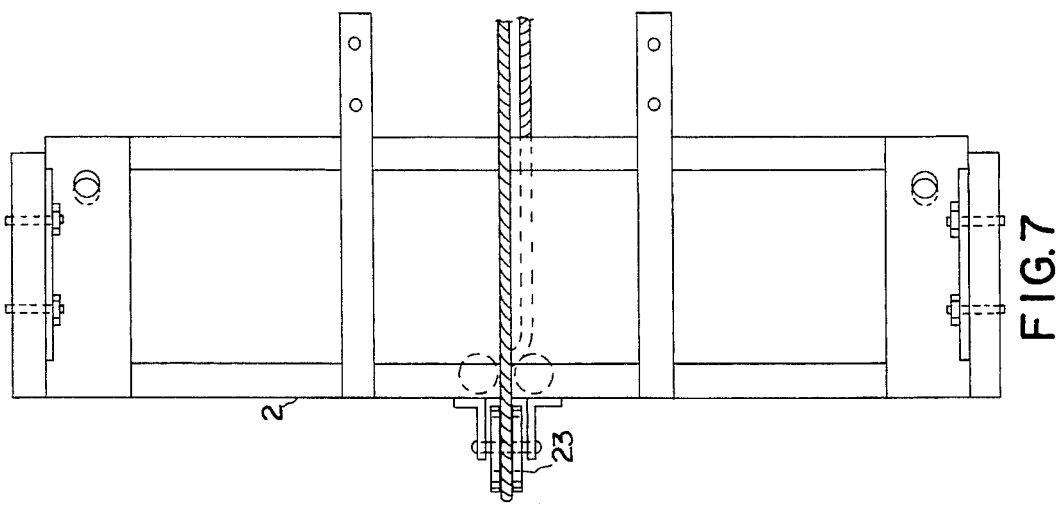
FIG. 7 shows the bottom of the back track of an improved ski exerciser with a rear longitudinal pulley reversing the direction of the tension applied.
Figure 8:
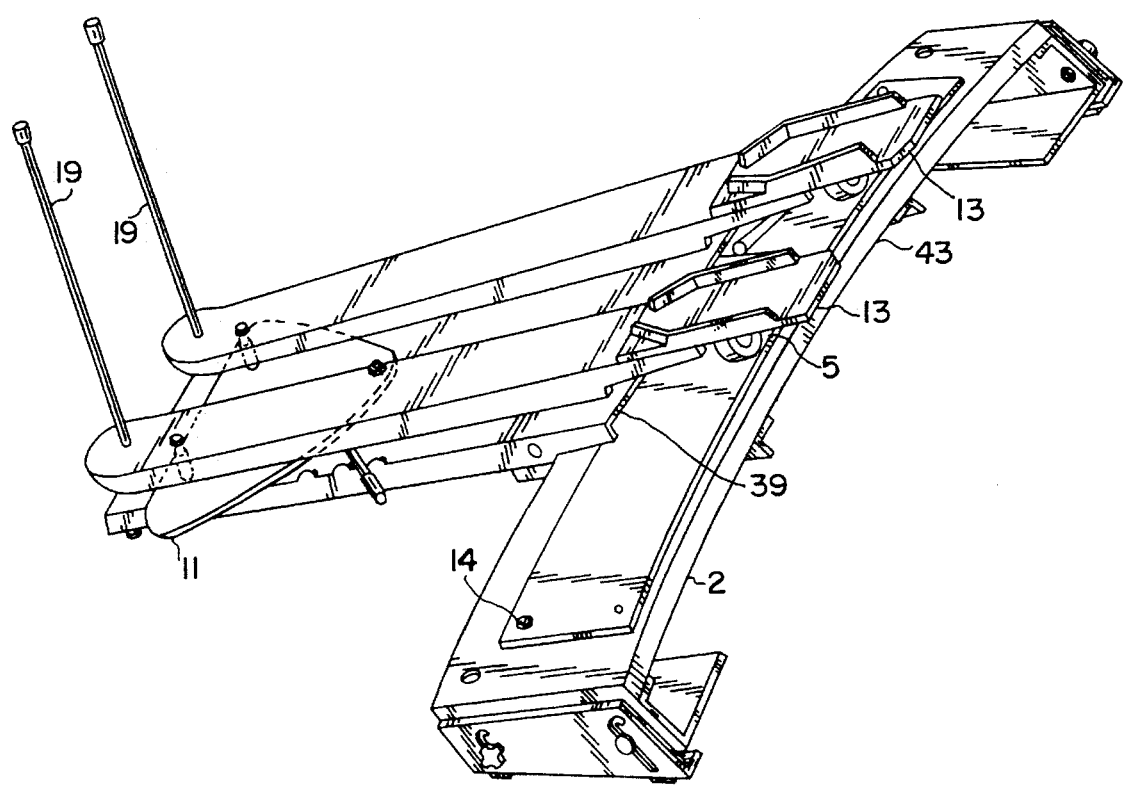
FIG. 8 is a top perspective view of an improved ski exerciser according to a further embodiment having a direct connecting spring cable folding link.

FIGS. 5–7 show the ski simulator in bottom view in two different positions; namely, FIGS. 5 and 6, respectively.

When the rearward ends of the skis are spread (FIG. 5), sliding sleeves 20 allow angle-tie-bar connector 21 to move forward, opposed by the tension of the wound spring 22 (reversed through pulley 23). The spring 22 provides an adjustable retraction type tension resistance by means of a coil end 24 that mounts beneath the assembly 1, is guided through L-guides 25, and is adjusted with a crank handle 26.

Sleeve 38, as shown in FIG. 15, is of the ball-bearing type.

Figures 9, 10, 11:
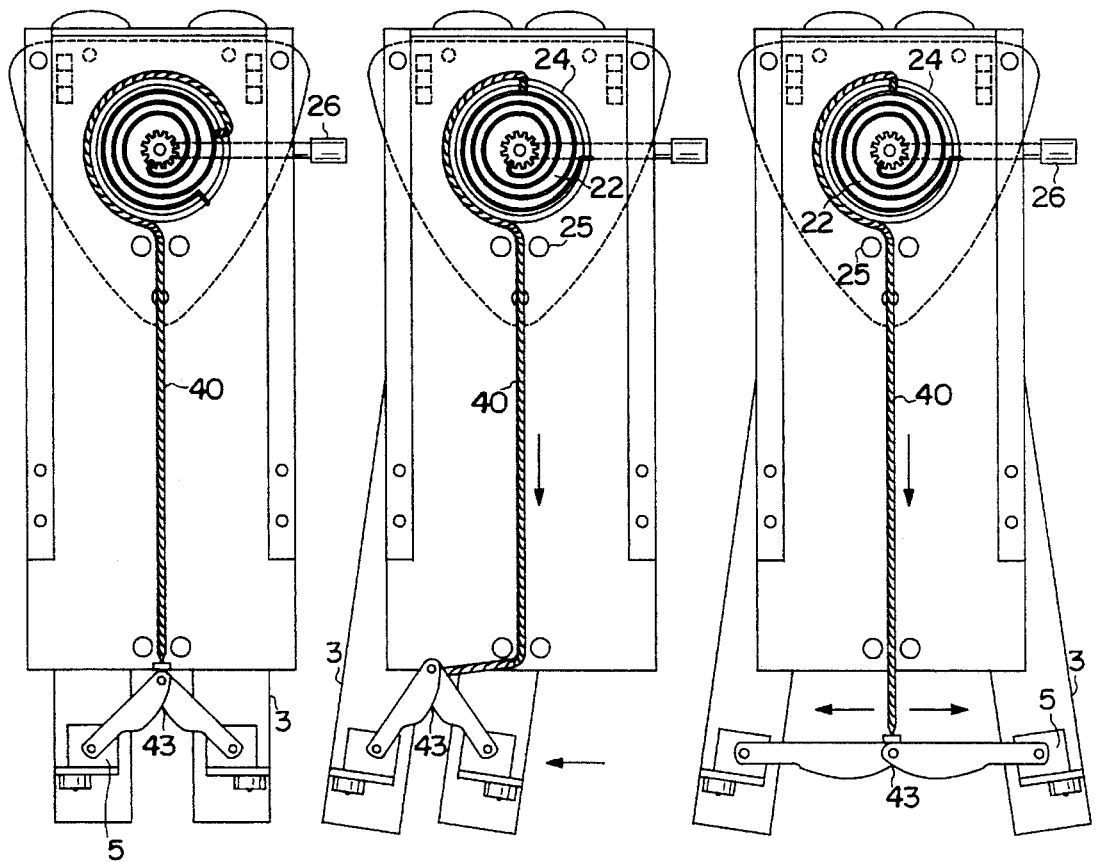
FIG. 9 is a bottom plan view of the direct connecting spring cable folding link device in a centered, retracted position with its laterally moveable ski tip means in a centered position.
FIG. 10 is a bottom plan view of the direct connecting spring cable folding link device in a radial off center movement displaying increased spring tension therefrom.
FIG. 11 is a bottom plan view of the direct connecting spring cable folding link device in a wedge type spread apart position showing increased spring tension while the cable is in a centered position.
Figure 12:
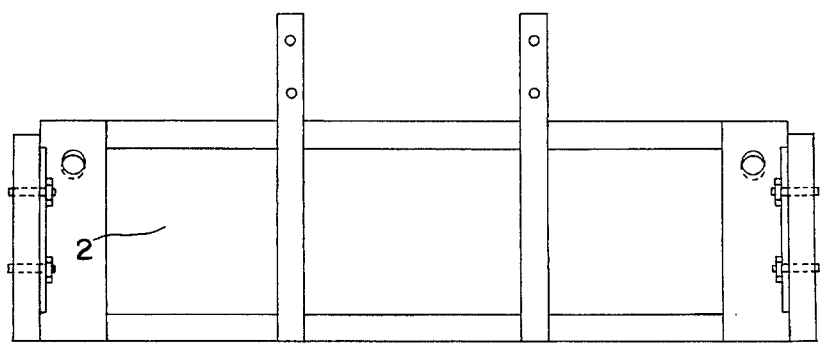
FIG. 12 is a bottom plan view of the back track of the direct connecting spring cable exerciser.
Figure 30:
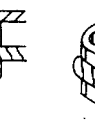
FIG. 30 is a top perspective view of the extended, flexed, stored edging indicator on the ski-type platform.
Figure 37:
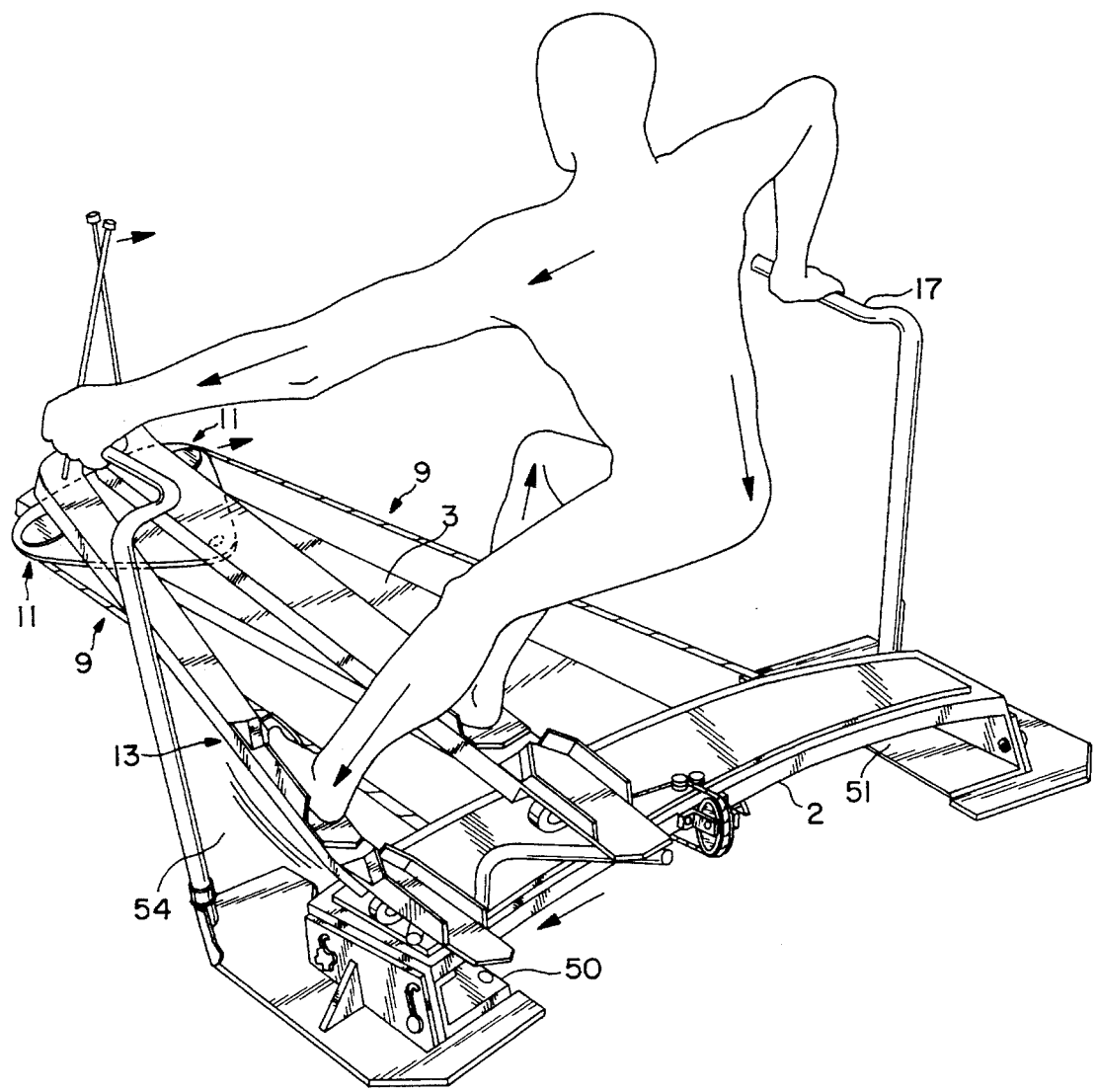
FIG. 37 is a dynamic perspective view of the improved ski exerciser according to a further preferred embodiment showing the control rods connected between swivelling connection points below the back track and their distal end connections to the front lateral pivoting tip assembly, wherein the user applies gravitational leveraging forces to reverse the outside skis camber simultaneous with lateral heel push of the tail and forward extension of that ski thereby simulating a ski-racing carved type turn.
Figure 38:
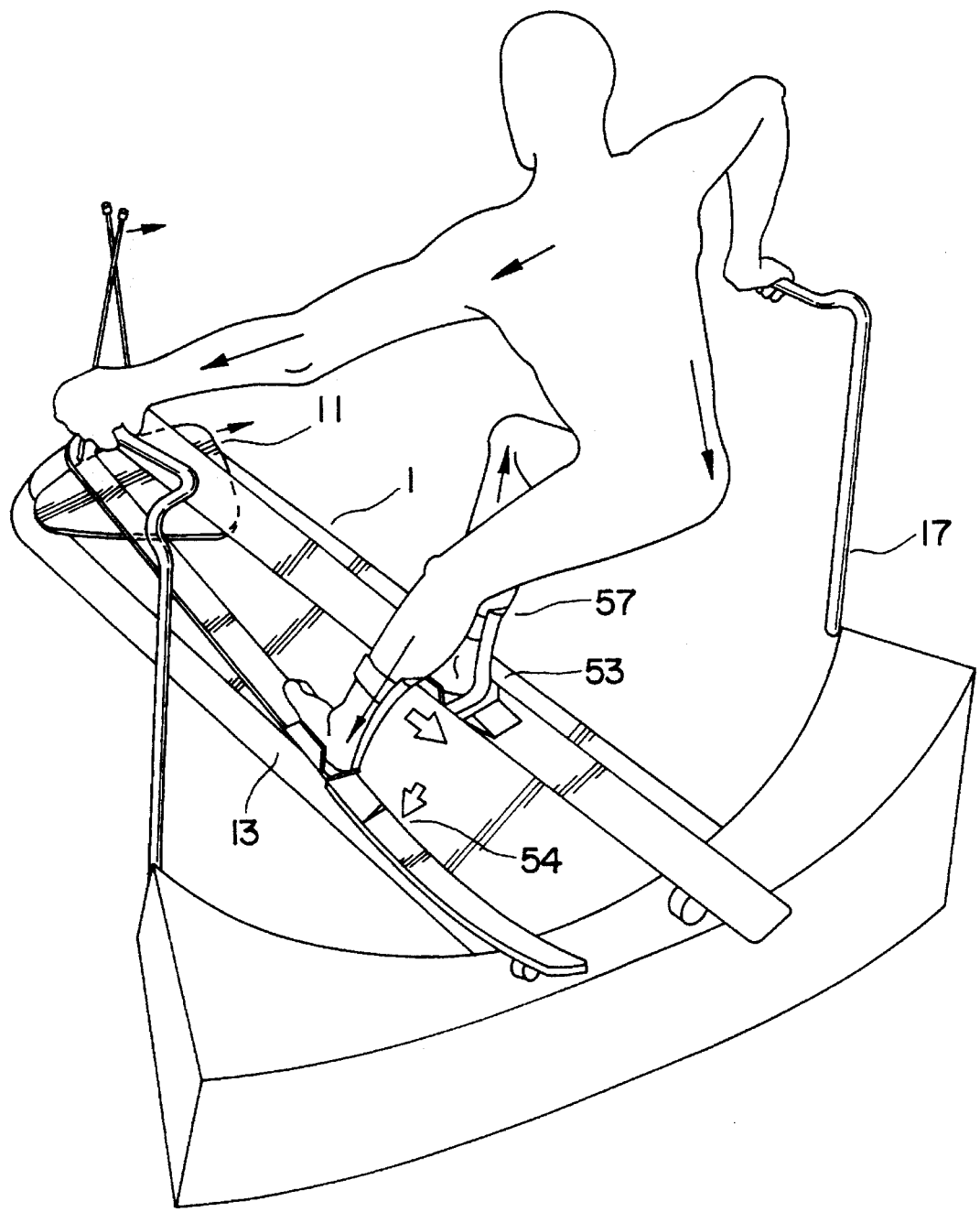
FIG. 38 is a dynamic perspective view of an improved ski exerciser according to a further preferred embodiment showing leveraging the rear section of the outside ski wherein the rearward movement of the user's lower leg transmits a rotary leverage through the leveraging device with attachment straps for securing a device attached to the foot placement guides.

Another preferred mechanical embodiment is shown in FIGS. 8–12 in a perspective top view (FIG. 8) and in three bottom plan views (FIGS. 9–11). This embodiment affects the same movement as the embodiment of FIGS. 5–7 by employing a vertical opening 39 between the rear of the front assembly 1 and the back track 2 of FIG. 8, allowing the tension cable 40 to directly attach to the center of the two or more folding arms that are connected at their outer ends to the truck pin 41 of each ski 3 shown in FIGS. 9–11. Spreading the skis outward draws the center folding cable connection point 42 of FIG. 11 to effectively increase spring tension, as well as when the two skis moving together pivot at their forward ends while moving radially at their rear ends from the center of travel point 43 shown in FIG. 11. With spreading and radial action occurring simultaneously, the greater spring tension resistance will be against the outwardly moving ski relative to the inward ski nearest to the center of travel point 43 of FIG. 10 as is the accepted method of skiing on snow.

In FIG. 17, foot holder 27 is bolted or screwed onto an adaptor plate 28, which similarly clamps over either foot plate 13.

FIG. 18 shows the pivot mechanism of the front assembly in detail. As may be seen, the pivot assembly 11 has pivoted thereon a moveable bar 11a which carries the individual pivots 4.

FIGS. 20–22 illustrate a mechanism for simulating skiing over terrain. FIG. 20 shows a bottom board 31 with a motor 29 connected to a holding board 30 of the ski simulator via arms 32 and 33. The holding board 30 is mounted to the bottom plate 31 via a hinge 31a.

In FIGS. 21 and 22 the motor 29 reciprocates the ski exercise machine holding board 30, hinged for support to bottom board 31, via arms 32 and 33. For water skiing a height adjustable elevation arm 34 is interposed between the boards as shown in FIG. 22. The arm has top and bottom members 35 and 36 respectively, which telescopes and adjusts by a pin 37.

Indicator 19 in FIGS. 23–32 is a two-piece construction, 21, being the seat/lock or sleeve, essentially a metal tube with a section removed, and retractable indicator 19 of a flexible synthetic material or rubber, with narrow neck for folding down in subjacent horizontal lip close to its lower end, for locking into place.

Figure 39:
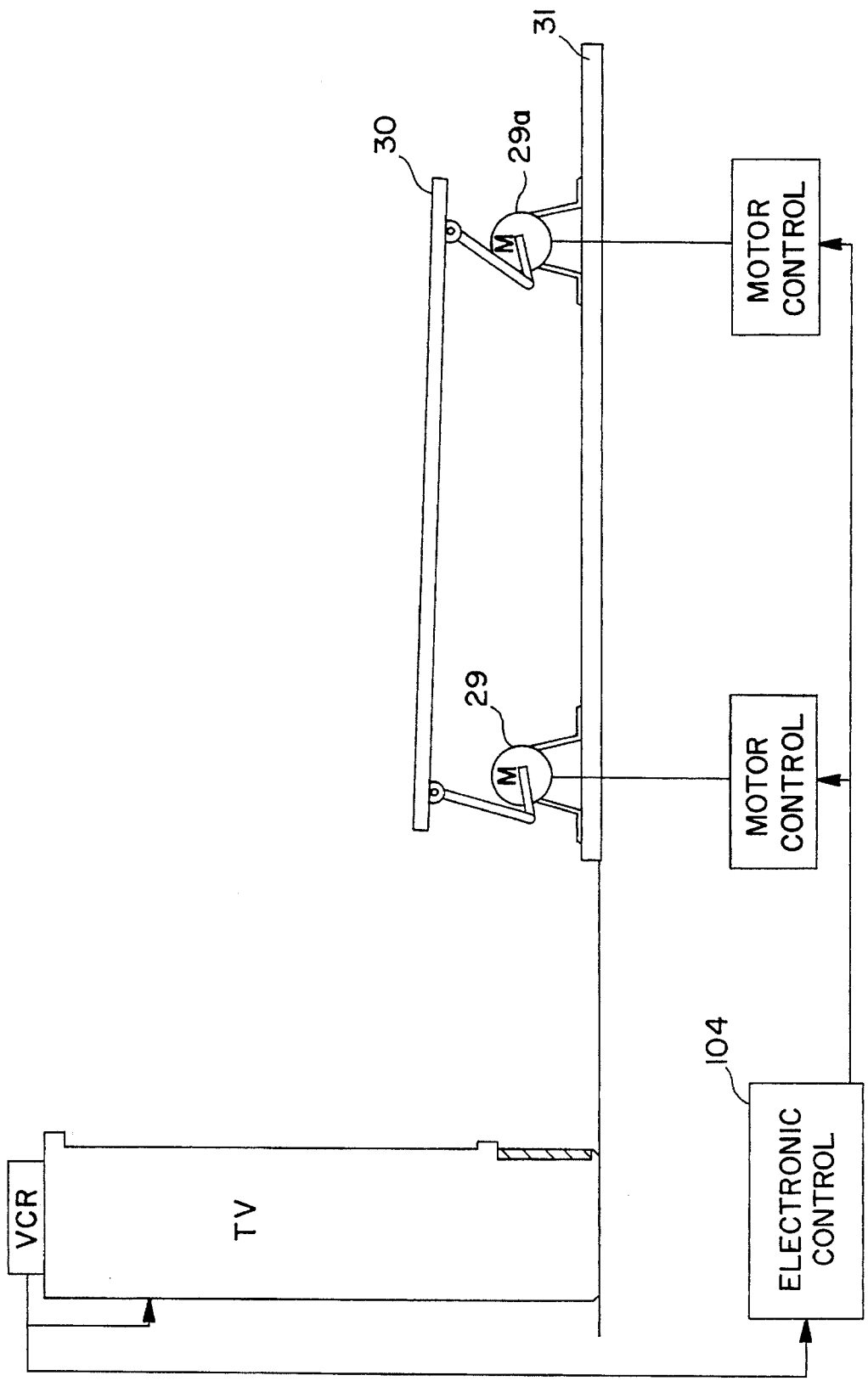
FIG. 39 is video interactive motorized means for vertical longitudinal raising or tilting of front and rear of the snow ski/snowboard/water ski training and exercise device, in order to simulate the entire series of tilting up-raising horizontal to upper level-tilting down-lowering rear to lower level horizontal of a mogul experience on a ski slope or of water changes (jumping a wake) while water skiing.

FIG. 39 illustrates how a ski simulator holding board 30 may be mounted on front and rear motors 29 and 29a, respectively. Placed in front of the ski simulator is an internal projection television set 100 which receives a television signal from a VCR 102. This television signal is also supplied to an electronic control device 104 which responds to commands inserted in the T.V. blanking interval and controls the motors 29 and 29a. The commands cause the motors to raise and lower the front and rear ends of the holding board 30 to simulate skiing conditions illustrated on the television screen.

There has thus been shown and described a novel exercise and ski simulating device which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An exercise or ski simulating device comprising, in combination:

(a) a front assembly means;

(b) a back track connected by attachment means to said front assembly means;

(c) first and second simulated skis pivoted at their forward ends to said front assembly means and extending rearward over said back track;

(d) first and second truck means each attached beneath a rear end of a respective one of said first and second skis, said first and second truck means movably resting upon said back track;

(e) tie-bar means attached to said first and second skis for adjusting the rear separation of said first and second skis, said tie-bar means being slideably connected to sleeves pivotally attached beneath said first and second truck means and said tensioning means connecting said front assembly means to said sliding tie-bar means, permitting simultaneous independent lateral spreading and arc type movements with single control resistance to both.

2. The device according to claim 1, further comprising tensioning means, connected between said front assembly means and said tie-bar means, for biasing said skis into a parallel configuration.

3. The device according to claim 1, further comprising two of said sleeves, each for a different said ski.

4. The device according to claim 1, further including means for preventing said truck wheels from scrubbing as they roll on said back track.

5. The device according to claim 1, including means extending between and operatively connecting said first and second truck means.

6. The device according to claim 4, wherein said scrubbing preventing means includes a control rod extending between said front assembly means and said first and second truck means for controlling the pivot angle of each of said truck wheels.

7. An exercise or ski simulating device comprising, in combination:
   (a) front assembly means;
   (b) a curved back track connected by attachment means to said front assembly means;
   (c) first and second simulated skis having forward ends pivotally attached to said front assembly means and rearward ends extending over said back track;
   (d) first and second truck means each attached beneath a rearward end of a respective one of said first and second skis, and movably resting upon said back track; and
   (e) control means for attaching the skis to said front assembly means and respective truck means in such a manner as to permit the skis to move longitudinally relative to the direction in which the user is simulating a turn.

8. The device according to claim 7, including means connecting the forward ends of said first and second skis so that they are laterally movable at their forward ends.

9. The device according to claim 7, wherein said forward ends of said skis are universally pivoted to said front assembly means.

10. The device according to claim 7, wherein said front assembly means includes a base and a pivot assembly, pivotally attached to said base and pivotally attached to said forward ends of said skis.

11. The device according to claim 7, further comprising fold down edging indicator vertical rods on top of lateral arc moving ski type platforms for visually amplifying their angle relationships.

12. The device according to claim 7, further comprising individual height adjustment means at respective ends of said curved back track for horizontal tilting to change a respective fall line, to allow traversing body positions where one foot is lower than the other and the ski exerciser is turned from facing a visual feedback means of a mirror or video presentation directly in line with the front assembly to an oblique 45° direction to one side, leaving a user to face the feedback means in a twisted sloped position similar to a snow skier in a traversing position which permits the rearward ends of the skis to move down and forward, as when a skier performs a stop action in the snow.

13. The device according to claim 7, further comprising inclination support poles adjustably detachably attached to either side of said curved back track, for body support when in a static unbalanced position and to produce leverage opposing the resistance of a spring cable.

14. The device according to claim 7, further comprising a front double swivel plate interposed between said skis/snowboarding and said front assembly means, with front pivot means to each of said skis and individual connecting rear pivot means from said back track to said front assembly means, to force the front of the pivoting ski type platforms to move laterally in an arc from said lateral movement of rear truck assembly.

15. The device according to claim 7, further comprising a single water ski/snowboard simulating adaptor plate and means for attaching said plate to said skis for individual snowboard and slalom type water skiing training.

16. The device according to claim 7, further comprising motorized mogul simulation means for providing vertical movement to said front assembly means and said back track.

17. The device according to claim 16, further comprising means for displaying a video image of a skiing scene and means, coupled to said video displaying means, for controlling said motorized means in synchronism therewith.

18. The device according to claim 7, further comprising motorized vertical moving water skiing means for providing vertical movement to said front assembly means.

19. The device according to claim 18, further comprising means for displaying a video image of a skiing scene and means, coupled to said video displaying means, for controlling said motorized means in synchronism therewith.

20. The device according to claim 7, further comprising central foot positioning means on the two distal ends of the supported ski lengths, for user applied adjustable bending force to apply reverse camber bending in order to simulate the carving manipulations used by snow skiers in advanced non-skid arcing trajectory type turns.

21. The device according to claim 7, further comprising video means electronically connected to monitor points apart from said skis for interactive display.

22. The device according to claim 7, further comprising adjustable tensioning means for biasing the rearward ends of said skis toward the center of said back track.

23. The device according to claim 22, wherein said tensioning means is manually adjustable.

24. The device according to claim 22, further comprising means for automatically adjusting said tensioning means in response to a video display of a ski scene.

25. The device according to claim 7, further comprising attachment means for connecting optional vertical lever action heel connecting members to foot retaining attachment means atop said skis, each of said heel members with attachment means connecting to a user's legs and feet similar to a ski boot in order to transmit selective bending to different areas along the ski's plate length simulating the carving of a ski turn on snow.

26. The device according to claim 7, further comprising rigid folding links type tie-bar means and a direct tension connection to a fold center attachment point of said folding links, permitting simultaneous independent and dependent lateral spreading and arc type movements of said skis with a single control resistance.

27. The device according to claim 7, further comprising inclination support means mounted upon said support means.

28. The device according to claim 7, further comprising permanently mounted retractable edging indication means for lay down storage and subsequent erection.

29. The device according to claim 7, further comprising detachably attached retractable edging indicator means for lay down storage means and subsequent erection.

30. The device according to claim 7, further comprising attachment means for connecting optional vertical lever action heel-connecting members to foot retaining attachment means atop said skis, each of said heel members with attachment means connecting to a user's legs and feet similar to a ski boot in order to transmit selective bending to different areas along the ski's plate length simulating the carving of a ski turn on snow.

* * * * *